June 11, 1963 L. A. MADDEN 3,093,393
COMBINATION TRAILER HITCH AND OVERLOAD SUPPORTING DEVICE
Filed Oct. 11, 1961 2 Sheets-Sheet 1
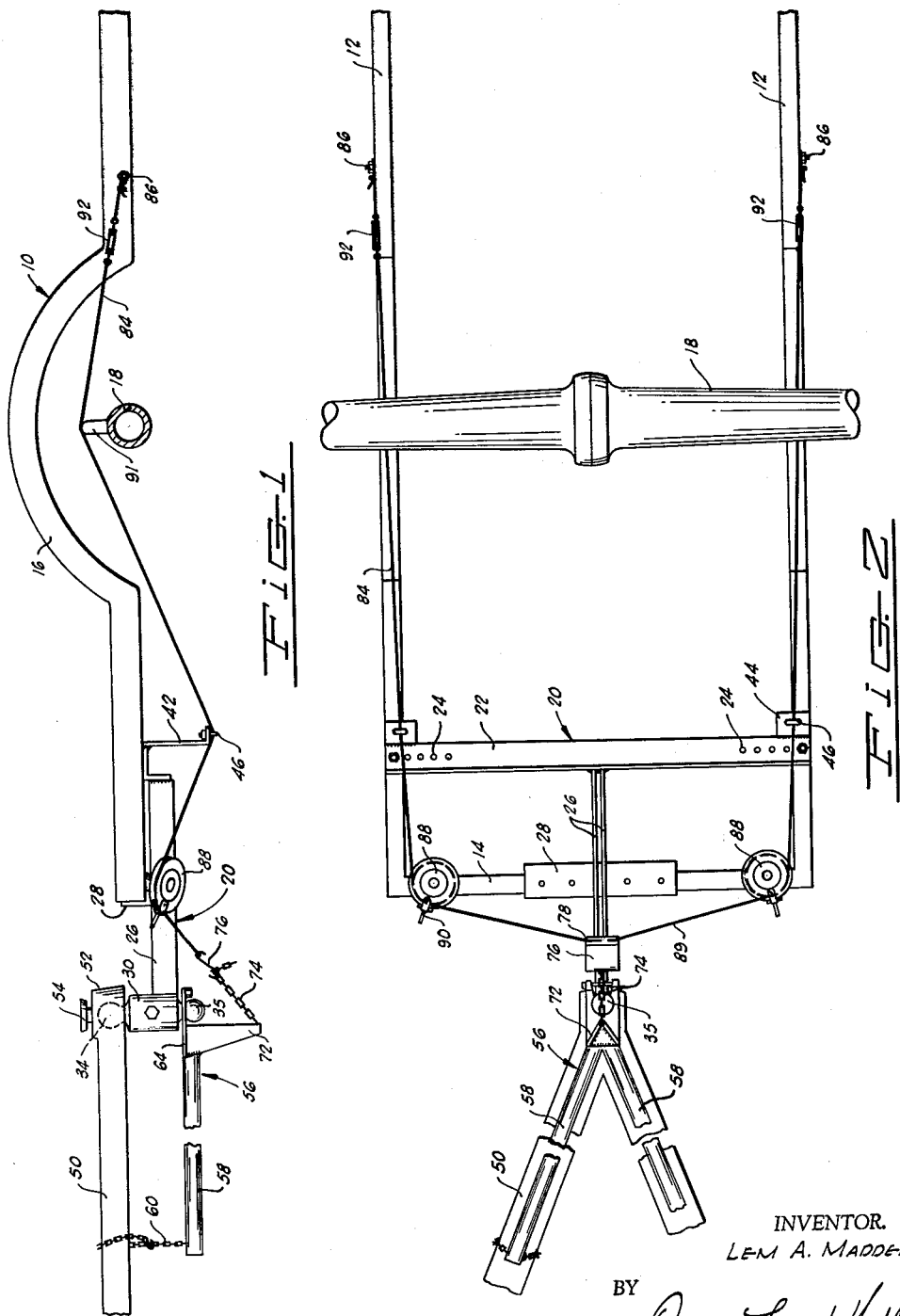
INVENTOR.
LEM A. MADDEN
BY
*Dunlap, Laney & Hubbard*
ATTORNEYS June 11, 1963 L. A. MADDEN 3,093,393
COMBINATION TRAILER HITCH AND OVERLOAD SUPPORTING DEVICE
Filed Oct. 11, 1961 2 Sheets-Sheet 2
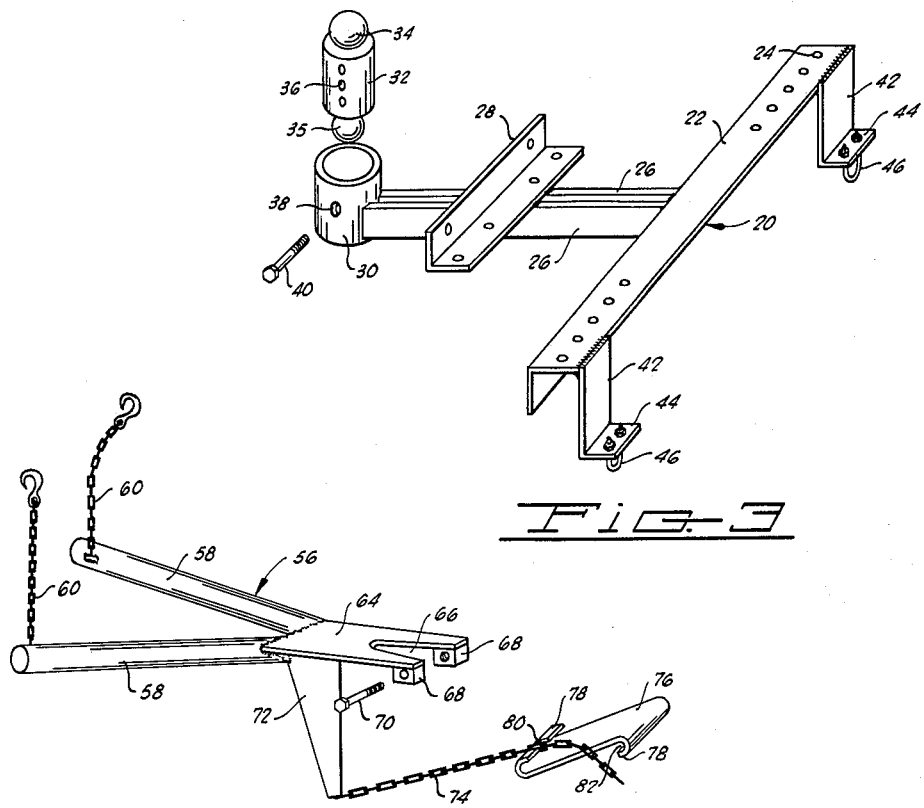
Fig. 3
Fig. 4
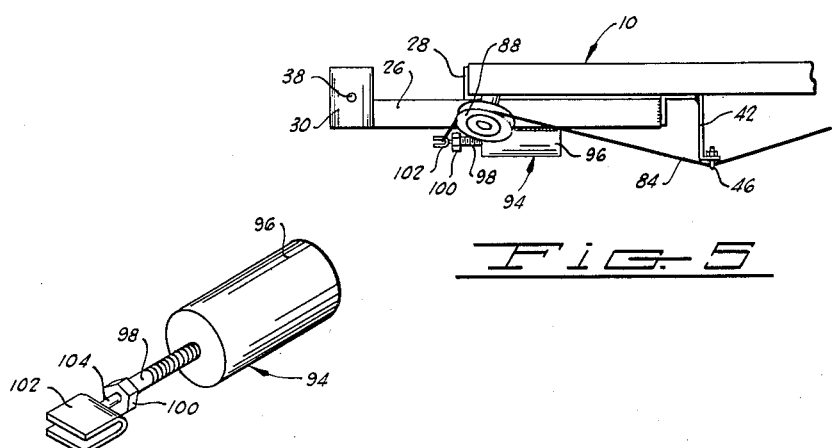
Fig. 5
Fig. 6
INVENTOR.
LEM A. MADDEN
BY
*Dunlap, Laney & Hubbard*
ATTORNEYS

United States Patent Office 3,093,393
Patented June 11, 1963

3,093,393
COMBINATION TRAILER HITCH AND OVERLOAD SUPPORTING DEVICE
Lem A. Madden, 4605 S. Melrose Drive, Oklahoma City, Okla.
Filed Oct. 11, 1961, Ser. No. 144,401
15 Claims. (Cl. 280—406)

This invention relates to assemblies for coupling a tractor vehicle to a trailer vehicle. More particularly, but not by way of limitation, the present invention relates to a trailer hitch for connecting a trailer to a towing vehicle so that the load imposed upon the vehicle by the trailer is more evenly distributed to the wheels thereof.

The location of the center of gravity of heavy trailers results in a substantial load being imposed on the rear springs and rear axle of a vehicle towing such trailers. Concurrently, the front wheels of the towing vehicle are relieved of a portion of their load with a resultant loss of traction and increased steering difficulty.

Numerous attempts have been made to compensate for the unbalanced load conditions existing when the heavy two-wheel trailers are connected to the towing vehicle. One of such attempts consists of the addition of extra stiff leaves in the rear springs of the towing vehicle.

More recently, equalization of the trailer load upon the four wheels of the towing vehicle has been sought by providing trailer couplings which utilize a rigid bar or rod which extends forwardly from the trailer's point of connection to the rear axle of the automobile, and also rearwardly from the point of connection to a point beneath the frame of the trailer.

Although the extended bar type of load distributing hitch has functioned effectively to distribute a greater portion of the weight to the front wheels of the towing vehicle, and thus to enhance the traction which those wheels attain, several marked disadvantages have characterized this type of hitch. Of these, the major disadvantages which accrue can be attributed to the fact that the bar applies the pivotal or torsional force to the rear axle housing and to one centrally located point in the frame, namely the center of the rear cross member which connects the two side members of the frame. This results in a substantial stress being applied to the bar at this point so that the bars frequently break or bend, and it may also result in a breaking or bending of the towing vehicle frame.

The present invention contemplates a trailer hitch assembly which reduces the effect of, most of the disadvantages which have characterized previous types of hitches. Broadly, the invention comprises a rigid drawbar structure which is connected to the frame of the tractor or towing vehicle in a manner to evenly distribute a portion of the weight of the trailer over the rear portion of said frame; a ball member or the like at the rear end of the drawbar to facilitate pivotally connecting the trailer thereto; lever means connected to the rear portion of the drawbar beneath the point of connection of the trailer thereto; and a flexible tension member, such as a wire cable or the like, which is connected at one of its ends to the lever means and at its other end to the frame of the tractor vehicle at a point ahead of the rear axle thereof. The flexible tension member is stretched tautly over the rear axle housing and is in contact therewith so that forces transmitted through the wheels to the axle housing, and tending to raise the axle housing with respect to the frame are in turn transmitted through the axle housing to the flexible tension member. The tension member therefore exerts an increased force on the lever means which is then caused to lift the rear end of the drawbar, and the forward end of the tongue of the trailer upward. This motion has the effect of relieving the rear springs of the tractor vehicle of sudden overloading as, for example, when the back wheels of the tractor vehicle pass over a large bump. It also aids, at such times, in maintaining an even distribution of weight to the front and rear wheels of the tractor vehicle and the wheels of the trailer. The latter effect also assists, of course, in maintaining traction at the front wheels of the tractor vehicle, preventing skidding and promoting better steering control.

In a more specific, but nonlimiting, sense of the invention, the flexible tension member employed is characterized by substantial elasticity, and is secured to said tractor vehicle in the shape of a loop. The bight of the loop extends from side to side of the frame of the tractor vehicle at the rear thereof, and the two ends of the resilient, flexible member are secured to the frame of the vehicle at each side thereof at points ahead of the rear axle. The resilient, flexible member is passed over the rear axle housing at an angle; so that, despite up and down movement of the axle housing, the flexible member will remain in contact with the axle housing, and will remain under tension.

In a preferred embodiment of the invention, guide means are provided on the frame of the tractor vehicle or upon the drawbar, not only to maintain the flexible tension member in the form of a loop as described above, but also to lead the tension member through several angles or changes of direction and over several compression members so that sudden changes in the force with which the resilient, flexible tension member bears against the axle housing are not transmitted through the flexible member as sudden force changes of equal magnitude acting upon the previously described lever means.

The guide means also is arranged to distribute a portion of the load acting on the flexible tension member directly to the rear end of the tractor vehicle frame at several points therealong. In this respect, the flexible tension member, the guide means, and the frame of the tractor vehicle act as a truss resting on the rear axle of the tractor vehicle and supporting a portion of the weight of the trailer and the tractor vehicle. The amount of tension which is initially placed in the flexible tensioning member, and its degree of elasticity, will determine how high the rear portion of the frame of the tractor vehicle is carried above its rear axle.

An important feature of the present invention is the utility of the flexible tension member as an overload supporting member even when the trailer is not connected to the tractor vehicle. Thus, by decreasing the length of the tension member by the use of turnbuckles or other suitable devices, the frame of the tractor vehicle is lifted higher from the rear axle thereof and a greater portion of the weight of the tractor vehicle and its load is carried by the flexible tension member. Conversely, the conventional rear springs of the tractor vehicle are relieved of a substantial portion of the load to which they would otherwise be subjected. Moreover, in the preferred embodiment of the invention described above, the flexible tension member may be made to serve as two independently acting overload springs—that is, one overload spring on each side of the tractor vehicle over the rear wheels thereof. This is accomplished by providing means for securing the two side portions of the loop formed by the flexible member at points adjacent each side of the rear end of the tractor vehicle. Each side portion of the loop will then function independently of the other, and the length and tension of each may be individually adjusted to control the amount of the load which is carried by that particular side portion.

From the foregoing general description of the invention, it will be apparent that a major object of the present invention is to provide a trailer hitch assembly which vastly improves the safety and ease with which very heavy trailers may be towed at relatively high speeds by tractor vehicles.

Another object of the present invention is to provide an overload supporting device for relieving the rear springs of a vehicle of excessive loads.

An additional object of the present invention is to provide an improved trailer hitch assembly which evenly distributes the combined weight of a trailer and the tractor vehicle to the wheels of the trailer and the tractor vehicle. Stated differently, the invention has as one of its objects the removal of some of the weight normally imposed upon the rear wheels of a tractor vehicle so that heavier trailers may be towed upon some highways which have previously been inaccessible to them by virtue of existing highway load limit laws.

A further object of the invention is to increase the traction between the ground and the front wheels of a towing vehicle when a heavy trailer is hitched to the rear of the towing vehicle.

An additional object of the invention is to minimize the detrimental effect upon the rear springs of a tractor vehicle caused by the rear wheels of the tractor vehicle passing suddenly over humps or depressions in a roadbed.

Another object of the present invention is to provide a trailer hitch assembly which effectively counteracts the unbalancing influence of centrifugal force experienced by both tractor and trailer vehicles when they are negotiating a curve at relatively high speed.

Yet another object of the present invention is to provide a trailer hitch assembly which distributes a greater portion of the trailer weight to the side portions of the frame of the tractor vehicle than has been the case with previous types of trailer hitch assemblies.

Another object of the invention is to provide a trailer hitch assembly having a double-ball hitch connection which permits the assembly to be utilized equally well for connecting either large mobile homes or small cargo trailers to a tractor vehicle.

A more specific object of the present invention is to provide an improved drawbar for coupling a trailer to a towing vehicle.

A further object of the present invention is to provide a trailer hitch assembly which can also function as a vehicle overload supporting device when not in use for connecting a trailer to a towing vehicle.

These and other objects and advantages of the present invention will become manifest upon reading the following disclosure in conjunction with a perusal of the accompanying drawings which illustrate my invention.

In the drawings:

FIG. 1 is a view in elevation of the frame of a tractor or towing vehicle, the tongue of a trailer, and the trailer hitch assembly of the present invention as it is used to connect the trailer to the tractor vehicle. The rear axle housing of the tractor vehicle is illustrated in section.

FIG. 2 is a plan view of the arrangement illustrated in FIG. 1 as it appears when viewed from beneath the tractor vehicle.

FIG. 3 is a perspective view of the drawbar and ball hitch used to connect the trailer to the tractor vehicle.

FIG. 4 is a perspective view of the lever means which is used to apply a downward force to the rear wheels of the trailer vehicle and an upward force to the hitch connection between the trailer and tractor vehicle.

FIG. 5 is a view in elevation of a modified embodiment of the invention.

FIG. 6 is a perspective view of the tensioning device which is secured to the drawbar of the modified embodiment illustrated in FIG. 5.

Referring now to the drawings in detail, and particularly to FIG. 1, reference character 10 designates the rear portion of the frame of a tractor vehicle. In many contemporary types of passenger automobiles, the frame 10 is characterized in having a pair of side members 12 which are interconnected at the rear ends of the vehicle by a cross member 14. Each of the side members 12 has an arched portion 16 which passes over the rear axle housing 18 of the tractor vehicle.

In order to facilitate the connection of a trailer to the tractor vehicle, a drawbar designated generally by reference character 20 is secured to the rear portion of the tractor vehicle frame 10 in a manner most clearly illustrated in FIG. 2. The drawbar, per se, is illustrated in FIG. 3 and comprises a cross member 22 which is provided with a plurality of aligned apertures 24 adjacent each of its ends to facilitate connecting the cross member to vehicle frames of varying widths. A pair of parallel beams 26 are secured to the center of the cross member 22 and extend rearwardly therefrom, passing under the cross member 14 of the tractor vehicle frame 10. An angle iron supporting bracket 28 is welded to the top of the beams 26 and is bolted to the cross member 14 of the frame 10.

At the rear end of the beams 26, a cylindrical sleeve 30 is welded to the beams 26 and is of a diametric size to slidingly receive a cylindrical connecting member 32 having a ball 34 at the upper end thereof and a ball 35 at the lower end thereof. The connecting member 32 is of a length such that the balls 34 and 35 on each end thereof project beyond the ends of the cylindrical sleeve 30. A plurality of axially spaced apertures 36 are formed in the connecting member 32, and are positioned for alignment with an aperture 38 formed in the cylindrical sleeve 30. A pin 40 is passed into the apertures 38 and 36 and is used to adjust the distance which each of the ball members 34 and 35 project beyond the ends of the cylindrical sleeve 30.

At the forward, or leading edge of the cross member 22 of the drawbar 20, a pair of L-shaped compression members 42 are rigidly secured to the edge of the cross member and depend downwardly therefrom at right angles. Each of the L-shaped compression members 42 has a foot portion 44 which receives a downwardly projecting U-bolt 46.

As shown in FIGS. 1 and 2, the drawbar 20 is secured to the rear portion of the frame 10 of the tractor vehicle with the beams 26 projecting rearwardly therefrom so that the tongue 50 of a trailer to be towed by the tractor vehicle may be connected thereto. The tongue 50 carries a socket 52 at its forward end to receive the upper ball 34. A clamping member 54 is utilized to securely engage the ball 34 and prevent the disengagement of the tongue 50 from the drawbar.

The lever means, which is utilized in the present invention for applying a downward force upon the wheels of the trailer, and an upward force to the hitch connection between the trailer tongue 50 and the drawbar 20, is illustrated in FIGS. 1, 2 and 4, and is designated generally by reference character 56. The lever means comprises an A-frame 58 having a pair of diverging legs which extend parallel to the diverging portions of the tongue 50 as best illustrated in FIG. 2. At the free ends of the diverging legs of the A-frame 58, a pair of chains 60 are employed to connect the A-frame to the trailer tongue 50. At the forward end of the A-frame 58, the legs thereof are welded or otherwise suitably secured to a flat plate 64 which is slotted at its forward end, as indicated by reference character 66. A pair of apertured blocks 68 are attached to the underside of the plate 64 on opposite sides of the slot 66. The aperture in one of the blocks 68 is threaded so that a safety pin 70 may be threaded therein in order to prevent the plate 64 from becoming detached from the lower ball member 35 when it is secured thereto in the manner shown in FIGS. 1 and 2.

At the rear portion of the underside of the plate 64, an elongated lever arm 72 of generally V-shaped cross-sectional configuration extends downwardly from the plate 64 in a direction substantially normal thereto. A chain 74 having relatively large links (for a reason hereinafter explained) is secured at one of its ends to the lower end of the lever arm 72. Adjacent the other end of the chain 74, a generally S-shaped plate 76 having its end portions 78 turned back upon the plate is adjustably attached to the chain 74 by means of a notch 80 formed in one of the end portions 78. The other end portion 78 of the plate 76 forms a groove or channel 82 with the main body portion of the plate.

An important element of the present invention is the flexible tension member designated by reference character 84 and illustrated in FIGS. 1 and 2. The flexible tension member 84 is connected at its ends 86 to each of the side members 12 of the frame 10 at a point which is located forward of the rear axle housing 18. From these points of connection, the flexible tension member passes over the axle housing 18, through the U-bolts 46 at the lower ends of the compression members 42, and around a pair of sheaves 88 which are rotatably mounted at opposite corner of the rear of the frame 10 of the tractor vehicle. Thus, a bight 89 is formed in the flexible tension member 84 and extends across the rear end of the frame 10 of the tractor vehicle in the manner shown in FIG. 2. Each of the sheaves 88 is provided with a latching device 90 which permits the flexible tension member 84 to be firmly secured in the troughs of the sheaves to prevent movement of the tension member relative to the sheave. In other words, the flexible tension member 84 can be stopped off at the sheaves 88 so that each leg of the tension member may function as an individual overload supporting member in the manner subsequently to be described. In order to avoid undesirable frictional wearing away of the axle housing 18 due to rubbing of the flexible tension member 84 thereon, a pair of wear receiving projections 91 are interposed between the tension member and the axle housing. In order that the angularity of the tension member as it passes over the axle housing may be increased, it is desirable that the projections 91 be of relatively large height.

As shown in FIGS. 1 and 2, the bight portion 89 of the flexible tension member 84 is engaged by the channel 82 of the plate 76 so that the tension member may be pulled taut when the A-frame 58 of the lever means 56 is pulled upwardly. The length of the tension member 84 may also be varied by the employment of a pair of turnbuckles 92 which are interposed in each of the tension members adjacent the points of securement of the ends 86.

*Operation*

Let it first be assumed that the trailer hitch assembly of the present invention is to be used for connecting a trailer to a tractor vehicle, rather than being used simply as an overload supporting device. The flexible tension member 84, which is preferably a rope core wire cable having considerable elasticity, is initially secured at its two free ends 86 to the side members 12 of the frame 10 of the tractor vehicle. The points of securement of the ends 86 of the flexible tension member 84 are, as has previously been indicated, well forward of the rear axle housing 18.

The flexible tension member 84 extends rearwardly from the points of securement of its ends 86 over the projections 91 secured to the axle housing 18, through the U-bolts 46 at the lower end of the L-shaped compression members 42, and around the sheaves 88 located at opposite corners of the rear of the frame 10 of the tractor vehicle. Thus, as illustrated in FIG. 2, the flexible tension member is confined in a U-shaped path with a leg thereof extending along each side member 12 of the frame 10, and a bight portion 89 extending transversely across the rear end of the tractor vehicle. The relative positions of the rear axle housing 18, the compression members 42 and the points of securement of the ends 86 of the flexible tension member 84 are such that an angle of substantially less than 180° is subtended by the tension member 84 as it passes over the projections 91 secured to the axle housing 18.

To connect the trailer to the tractor vehicle, the socket 52 at the forward end of the tongue 50 of the trailer is placed over the ball 34, and the clamp 54 is tightened. It will be noted that the upper and lower balls 34 and 35, respectively, are of differing sizes so that the hitch assembly of the present invention may be utilized to connect trailers of varying sizes by the simple expedient of reversing the positions of the balls. After the socket 52 is engaged with the ball 34, the tongue 50 of the trailer will still be resting upon the jack (not shown) of the trailer so that almost all of the weight of the trailer is supported by the rear wheels thereof and the trailer jack. The bight portion 89 of the flexible tension member 84 is passed through the channel 82 of the plate 76, and the slot 66 of plate 64 is engaged with the lower ball 35 of the hitch. Practically all of the slack is then removed from the flexible tension member 84 by tightening the turnbuckles 92. The A-frame 58 is next pivoted upwardly about the ball 35 until the diverging legs of the frame are in substantial parallelism with the tongue 50 of the trailer as shown in FIG. 1. The chains 60 are then used to connect the diverging legs of the A-frame 58 to the tongue 50.

Upward pivotation of the legs of the A-frame 58 is resisted by the flexible tension member 84, and conversely, such upward movement has the effect of placing this member in tension. It will also be apparent that this movement of the A-frame 58 of the lever means 56 is effective to lift the rear portion of the frame 10 of the tractor vehicle higher off the rear axle thereof. In other words, forces tending to reduce the tortuousness of the path of flexible member 84 also tend to increase the distance between the frame 10 and the axle 18. Lifting of the rear portion of the frame 10, in turn, shifts the center of gravity of the tractor vehicle further forward and increases the traction on the front wheels thereof. Of course, the magnitude of the distance by which the frame 10 is lifted above the rear axle housing 18, will depend upon the amount of tension placed in the flexible tension member 84, and upon the elasticity of the tension member. As indicated above, it is contemplated that a suitable wire cable will be used as the tension member 84, and I have found that superior results are obtained when a rope core cable having a relatively high degree of elasticity is used.

After the diverging arms of the A-frame 58 have been connected to the tongue 50 of the trailer as shown in FIG. 1, the rear end of the frame 10 of the tractor vehicle should be high enough above the front end of the frame that the subsequent release of the trailer jack to transfer the load of the trailer to the drawbar 20 will not have the effect of depressing the rear end of the tractor vehicle frame below the position in which it is level with the front end thereof. Whether a depression of this magnitude occurs will, of course, depend upon the resilience of the flexible tension member 84, as it is readily apparent that if the member 84 is substantially inelastic, no relative movement of the frame 10 toward the axle housing 18 can occur without parting the tension member. If it should be desired to lift the rear portion of the frame 10 even higher with respect to the rear axle housing 18 than it has been lifted by securing the A-frame 58 of lever means 56 to the tongue 50, this may be accomplished by further increasing the tension in the flexible tension member 84 by utilizing the turnbuckles 92. This action, of course, can also be taken after the trailer jack is released in order to return the tractor vehicle frame 10 to a level status if it should be depressed too far at the rear end thereof when the trailer weight is shifted to the drawbar 20. In any event, by properly adjusting the tension and/or length of the flexible tension member 84, the frame 10 of the tractor vehicle may be made to assume a level position when the trailer is connected thereto, or, if desired, a position in which the rear end of the frame is slightly higher than the front end thereof. This, as has been indicated, assures that adequate traction will be retained at the front wheels of the tractor vehicle, and that a large portion of the excessive weight which would normally be supported by the rear wheels and rear springs of the tractor vehicle will be transferred to the front wheels thereof, and to the wheels of the trailer.

In addition to its function in maintaining the level of the frame 10 of the tractor vehicle, the flexible tension member 84 also functions to distribute the unbalanced weight of the trailer more evenly to the rear portion of the frame. As the trailer jack is released, it is true that a substantial portion of the trailer's weight is transferred through the drawbar 20 to the central portion of the cross member 14. However, a considerable portion of the newly added weight is received by the flexible tension member 84 and is transferred thereby to the side members 14 of frame 10 through the L-shaped compression members 42 and the sheaves 88. This results in a reduction in the load which is imposed upon the beams 26 of the drawbar 20 and, in turn, in the load which is concentrated at the center of the cross member 14 of frame 10.

A large part of the imposed load is, of course, supported by the flexible tension member 84 and rear axle housing conjunctively. It is proper to state therefore that the flexible tension member is an overload supporting device functioning to relieve the rear springs of the vehicle from the detrimental effects of excessive loading. This will be apparent when it is noted that the frame 10 of the tractor vehicle cannot be moved closer to the rear axle housing 18 thereof unless the tension member 84 is stretched or in some manner elongated. This, in turn, will depend upon the elasticity of the tension member 84 and the tension under which it is placed. Thus, to effectively relieve the rear springs from the compressive effect of relatively heavy loads, a tension member having relatively little elasticity may be used, or the turnbuckles might be taken up to impart a high tension to the tension member, or both. Of course, it is desirable that the flexible tension member possess some elasticity in order that the ride experienced in the tratcor vehicle be relatively "soft" rather than rigid and bumpy.

It is interesting to note the reactions which occur when one or both of the rear wheels of the tractor vehicle pass over a high spot or a depression in the highway. If, for example, the right rear wheel of the tractor vehicle passes over a high spot or bump in the highway, two things occur as a result of the greater tension imparted to the flexible tension member 84 by the upwardly moving axle housing 18. First, the tension member 84 pulls upwardly and forwardly upon the lever arm 72, and also pushes upwardly on the compression member 42 on the right side of the tractor vehicle. This causes a downward force to be applied to the trailer tongue 50 at a medial point therealong, an upward force to be applied to the rear end of the drawbar 20, and an upward force to be applied to the rear end of the frame 10 through the compression members 42. The rear end of the frame 10 is therefore lifted upwardly relative to the axle housing 18, relieving the rear springs of the sudden shock loading which they would otherwise receive, and also transferring more of the total weight to the front wheels of the tractor vehicle and to the wheels of the trailer at an instant when traction at these points is very important.

The second result caused by the right rear wheel of the tractor vehicle hitting a bump is the transmission of a downward force to the left rear wheel of the tractor vehicle through the tension member 84. This assures that the left rear wheel will remain in constant contact with the ground, thus minimizing the possibility of loss of steering control by the operator due to slipping and lurching of the tractor vehicle. It is to be noted that when a cable having considerable elasticity is used as the tension member, shocks imparted to the cable are damped out to some extent by the cable's contact with the compression members 42 and the sheaves 88.

If one or both rear wheels of the tractor vehicle pass suddenly over a depression or dip in the roadbed, the load acting downwardly upon the axle housing 18 through the flexible tension member 84 which passes thereacross, will force these wheels down into the depression so that continuous contact with the roadbed is maintained and no substantial loss in rear wheel traction will occur.

Another advantageous function of the trailer hitch assembly of the present invention may best be explained by referring to FIG. 2. As the tractor vehicle commences to round a curve in the highway, the frame 10 of the tractor vehicle will become angled with respect to the trailer instead of being aligned therewith as shown in FIG. 2. This will in turn cause the channel 82 in the plate 76 to become angled with respect to the cross member 14 at the rear of the frame 10 instead of extending parallel thereto. As the plate 76 and its channel 82 are thus turned relative to the frame 10, a greater tension is imposed upon one leg of the flexible tension member 84 than the other leg thereof. The leg which is placed under greater tension is the leg which is on the opposite side of the tractor vehicle from the direction in which the tractor vehicle is turning. In other words, if the tractor vehicle is turning to the right, the portion of the flexible tension member 84 which extends along the left side of the tractor vehicle is placed under a greater tension than the portion of the flexible tension member which extends along the right side of the tractor vehicle. This allows the frame 10 to move downwardly and closer to the rear axle housing 18 on the right side of the tractor vehicle, while simultaneously forcing the left side of the tractor vehicle upwardly and further away from the rear axle housing. This results in the effective counteraction of the centrifugal force which would otherwise tend to roll the tractor and trailer over on their left sides as they rounded a curve to the right at relatively high speeds. Of course, the opposite result is obtained when rounding curves to the left.

As has previously been stated, the flexible tension member 84 of the present invention may be made to function effectively as an overload supporting member even when a trailer is not being towed. Two modes of operation may be practiced. First, for simple longitudinal, or fore-and-aft, loading, it is only necessary to place the flexible tension member under a sufficiently great tension to relieve the rear springs of the load to the extent desired. This is accomplished in the preferred embodiments of FIGS. 1 and 2 by tightening the turnbuckles 86.

The second method of utilizing the flexible tension member 84 as an overload supporting device is to "stop off" the flexible tension member at the sheaves 88 by means of the latching devices 90. This "stopping off" prevents the flexible tension member 84 from moving relative to the sheaves 88 and, in effect, makes both the right and left legs of the tension member able to function independently of each other. Thus, the tension in the right leg of the tension member 84 may be varied by manipulation of its respective turnbuckle 92 without correspondingly changing the tension in the left leg of the tension member. Because of this individual functioning of the right and left legs of the tension member 84, the tension member may be used as a compensating overload supporting device where lateral overloading is confronted. By lateral overloading is meant the location on either the right or the left side of the vehicle of a load which is greater than that which the conventional springs of the vehicle are designed to support. Of course, any type of overloading of the rear springs of the vehicle can also be relieved by this arrangement, since the two legs of the flexible tension member 84 can both be tensioned to the extent required to relieve the overloaded conditions.

A modified embodiment of the invention is illustrated in FIG. 5. The modification resides in the securement of an overload tensioning device 94 to the lower side of the beams 26 of the drawbar 20 at the position where these beams cross under the supporting bracket 28. The overload tensioning device 94 includes a block 96 which is welded or otherwise suitably secured to the beams 26 and which is provided with a threaded axially extending bore (not seen). A threaded shaft 98, which is secured at one of its ends to a hex nut 100, is threaded into the bore in the block 96. A U-shaped channel member 102 is secured to the hex nut 100 by means of a short shaft 104 which is coaxially aligned with the threaded shaft 98. The U-shaped channel member 102, when thus connected to the shaft 104, extends normal to the axis of the threaded shaft 98, and rotation of the latter shaft moves it into or out of the block 96, causing the U-shaped channel member to be brought closer to, or moved further from, the block 96.

The provision of the overload tensioning device 94 in the modified embodiment of the invention permits the tension member 84 to be effectively utilized as an overload supporting device without the necessity of going beneath the tractor vehicle to tighten the turnbuckles 92. Thus, the medial portion of the bight 89 of the tension member 84 may be passed through the U-shaped channel member 102 and a wrench then used to engage the hex nut 100 to adjust the tension in the tension member 84. The amount which the threaded shaft 98 is extended from the block 96 will determine how much tension is placed in the tension member 84 and therefore, how much of the excessive load will be carried by the tension member as opposed to the conventional springs of the tractor vehicle.

From the foregoing description, it will be apparent that the present invention provides a trailer hitch assembly which is versatile in its applications, may be more safely employed in towing heavy trailers, and provides better distribution of trailer loads to all wheel surfaces in contact with the ground. A number of changes may be made in the various elements of the invention, and in their arrangement relative to each other, while still relying upon the principles hereinbefore disclosed. However, insofar as such changes continue to rely upon the inventive principles herein disclosed, they are considered to fall within the spirit and scope of the invention as defined by the following claims.

I claim:

1. A trailer load equalizing device for use with a tractor vehicle having a trailer drawbar connected to the frame thereof and a trailer having a tongue coupled to said drawbar by a trailer hitch, comprising lever means connected to said tongue for applying a downward force on the wheels of said trailer while applying a lifting force to the end of said tongue connected to said hitch; and a flexible tension member extending tautly over the rear axle housing of said tractor vehicle in contact therewith, said tension member being connected at one of its ends to the frame of said tractor vehicle forward of said rear axle and connected at its other end to said lever means for applying a force to said lever means when a tensioning force is applied to said flexible tension member through said axle housing.

2. A trailer load equalizing device as claimed in claim 1 and further characterized to include guide means on the frame of said tractor vehicle and cooperating with said cable for transferring a portion of a tensioning force applied to said cable to said frame between said rear axle housing and the rear end of said frame.

3. A trailer load equalizing device for use with a tractor vehicle having a trailer drawbar connected to the frame thereof, and a trailer having a tongue coupled to said drawbar by a trailer hitch, comprising a rigid bar connected at one end to said hitch and at its other end to said tongue and extending parallel to said tongue along the underside thereof; a lever arm depending downwardly from said bar adjacent said one end of said bar and rigidly secured thereto; a resilient tension member secured at one of its ends to the lower end of said lever arm and at its other end to the frame of said trailer vehicle forward of the rear axle housing thereof, and extending tautly over the rear axle housing of said vehicle; and guide means on said vehicle frame defining a path for said flexible tensioning member whereby said flexible tension member exerts upward and forward components of force on the lower end of said lever arm, and a continuously acting downward force on said axle during downward movement of said axle in the operation of said tractor vehicle.

4. A trailer load equalizing device as claimed in claim 2 wherein said guide means comprises a rigid compression member depending downwardly from said frame rearwardly of said rear axle housing with its lower end below a plane including said rear axle housing and the point of connection of said cable to said frame; and sheave means secured to the rear end of said frame and above and ahead of said lever means.

5. A trailer load equalizing device for use with a tractor vehicle having a trailer drawbar connected to the frame thereof, and a trailer having a tongue coupled to said drawbar by a trailer hitch, comprising lever means connected to said tongue for applying a downward force to the wheels of said trailer while applying a lifting force to the end of said tongue connected to said hitch, said lever means including a rigid lever member extending downwardly from the forward end of the tongue of said trailer in a direction substantially normal thereto; a pair of sheaves rotatably mounted on opposing corners of the rear of said tractor vehicle frame; a resilient tension member disposed in a generally U-shaped path with its free ends secured to each side of the frame of said tractor vehicle ahead of the rear axle thereof, said tension member having substantially parallel portions extending tautly from its secured ends over said rear axle and in contact therewith along opposite sides of said tractor vehicle, and having a connecting bight portion reeved around said sheaves and interconnecting said parallel portions; and a connecting member interconnecting the middle of said bight portion with the lower end of said lever member.

6. A trailer load equalizing device as claimed in claim 5 and further characterized to include a compression member depending downwardly from each side of the frame of said tractor vehicle between the rear axle and the rear end of said frame, said compression member bearing against said resilient tension member at their lower ends for damping forces transmitted through said flexible tension member when a force acts on said tractor vehicle tending to move said axle and said frame closer together.

7. A trailer load equalizing device as claimed in claim 5 wherein said connecting member comprises a chain connected at one of its ends to the lower end of said lever member; and a flat plate connected at one of its sides to the other end of said chain and having its side opposite said one side bent back upon itself to form an elongated channel for engaging the bight portion of said resilient tension member whereby when said trailer vehicle turns in negotiating a curve, the parallel portion of said resilient tensioning member which is on the outer side of said tractor vehicle is placed under greater tension than the parallel portion of said resilient tension member on the inner side of said tractor vehicle.

8. A trailer load equalizing device as claimed in claim 5 and further characterized to include tensioning means secured to said drawbar for adjustably tensioning said resilient tensioning member whereby said resilient tensioning member may be utilized as an overload supporting device when said trailer is disconnected from said tractor vehicle.

9. A trailer load equalizing device as claimed in claim 5 and further characterized to include locking means on said sheaves for locking said tension member against movement around said sheaves; and adjustable tensioning means in each of said parallel portions of said tension member for varying the tension in either of said parallel portions when said tension member is locked to each of said sheaves whereby each of said parallel portions may act individually as an overload carrying member.

10. A trailer hitch assembly comprising a drawbar adapted for securement to the frame of a trailer towing vehicle, said drawbar having a rigid cross-member dimensioned to extend from one side of said frame to the other, a connecting member secured at one of its ends to a medial portion of said cross-member and extending normal thereto, and ball hitch means secured to said connecting member at the other end thereof; a rigid bar detachably connected at one of its ends to said ball hitch means; means for connecting the other end of said rigid bar to the tongue of a trailer to be towed at a point rearwardly spaced from said ball hitch means; a lever arm depending downwardly from said bar adjacent its end connected to said ball hitch means; and a resilient tensioning member passing tautly over the rear axle housing of said towing vehicle in contact therewith and connected at one of its ends to the frame of said towing vehicle forward of said rear axle housing, and connected at its other end to the lower end of said lever arm for applying a force to said lever arm when a tensioning force is applied to said tension member through said rear axle housing.

11. An overload supporting device for relieving from excessive loading the rear springs of a four wheeled vehicle having a generally rectangular frame and forward and rear axles, said overload supporting device comprising a pair of sheaves rotatably mounted on opposing corners of the rear of said vehicle frame; a generally U-shaped flexible tension member beneath said vehicle and having two parallel portions extending along each side of said vehicle and a bight portion reeved around said sheaves and interconnecting said parallel portions, said parallel portions each being connected at its free end to the frame of said vehicle forward of the rear axle housing thereof, and each extending tautly across said rear axle housing and in contact therewith; means on said sheaves for locking said cable against movement around said sheaves; and tension adjusting means in each of said parallel portions of said flexible tension member for varying the tension in either of said parallel portions when said cable is locked to each of said sheaves whereby each of said parallel portions may act individually as an overload supporting member.

12. An overload supporting device for relieving from excessive loading the rear springs of a four wheeled vehicle having a generally rectangular frame and forward and rear axles, said overload supporting device comprising a rigid compression member extending downwardly from said frame between the rear end thereof and said rear axle; and a resilient, soft core cable connected at its ends to said frame on opposite sides of said rear axle and extending tautly over the rear axle housing and the lower end of said compression member, said compression member bearing at its lower end against said cable for damping forces transmitted through said cable when a force acts on said vehicle tending to move said vehicle and said frame closer together.

13. An overload supporting device for relieving from excessive loading the rear springs of a four wheeled vehicle having a generally rectangular frame and forward and rear axles, said overload supporting device comprising a generally U-shaped flexible tension member beneath said vehicle and having two parallel portions extending along each side of said frame and a bight portion extending across the rear of said frame, said parallel portions each being connected at its free end to said vehicle frame forward of the rear axle housing and extending tautly over said rear axle housing in contact therewith; and adjustable tensioning means secured to said frame at the rear end thereof and engaging the bight of said U-shaped flexible tension member, said tensioning means comprising a block secured to said frame and means secured to said block and movable relative thereto for biasing the bight of said tension member rearwardly from said frame.

14. An overload tensioning device as claimed in claim 13 and further characterized to include means for fixedly securing the rear ends of each of said parallel portions to the rear corners of said frame whereby said parallel portions may be operatively isolated from the bight portion and may function as individual overload supporting devices.

15. An overload tensioning device as claimed in claim 14 and further characterized to include individual tension adjusting means in each of said parallel portions permitting said parallel portions to be individually tensioned and relaxed.

References Cited in the file of this patent

UNITED STATES PATENTS

| | | |
|---|---|---|
| 1,297,849 | Hofmann | Mar. 18, 1919 |
| 1,303,816 | Fuller | May 13, 1919 |
| 1,379,836 | Rackham | May 31, 1921 |
| 1,404,966 | Johnson | Jan. 31, 1922 |
| 1,631,103 | Martin | May 31, 1927 |
| 2,264,070 | Davis | Nov. 25, 1941 |
| 2,546,206 | Arehart | Mar. 27, 1951 |
| 2,772,098 | Seeley | Nov. 27, 1956 |

FOREIGN PATENTS

| | | |
|---|---|---|
| 72,335 | Switzerland | May 1, 1916 |
| 475,854 | France | Apr. 11, 1915 |